Sept. 24, 1940.   W. H. EDWARDS   2,215,903
TRACTOR-TRAILER COMBINATION
Filed Oct. 10, 1936   3 Sheets-Sheet 1
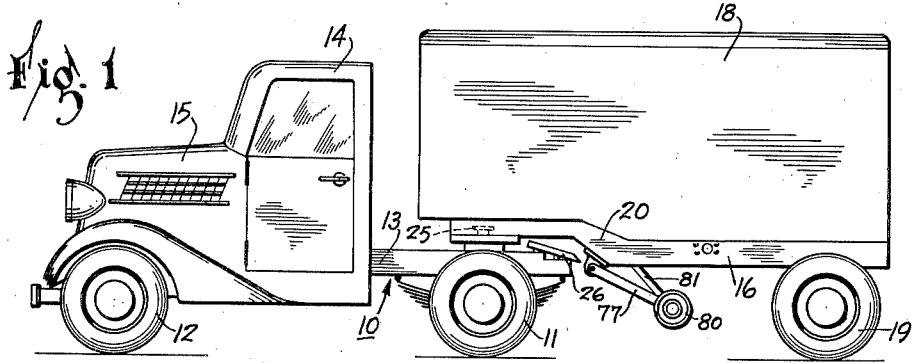
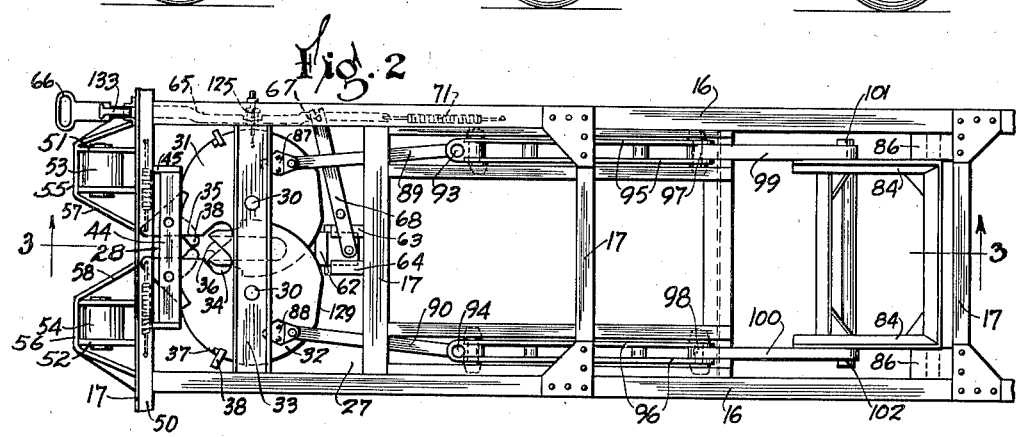
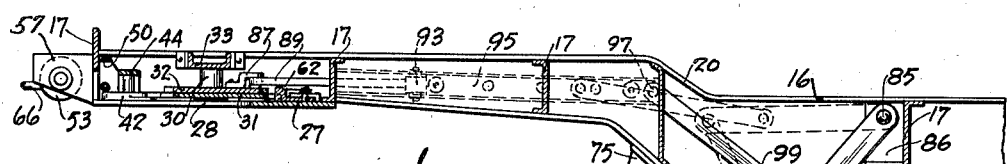
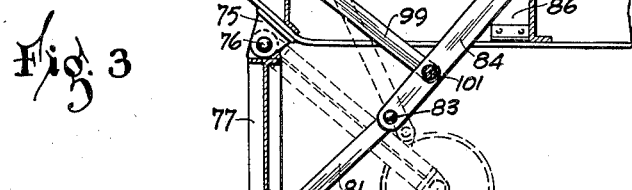
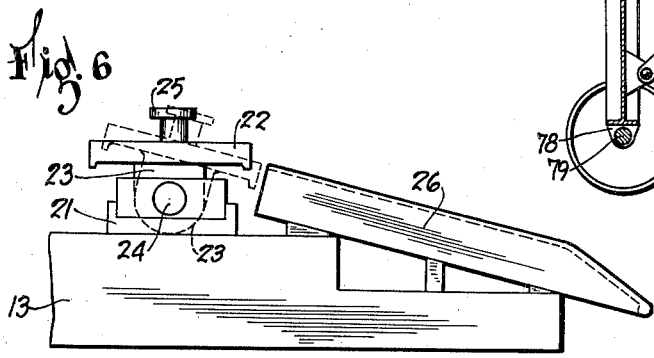
INVENTOR.
WILLIAM HOWARD EDWARDS
BY
P. W. Pomeroy
ATTORNEY.

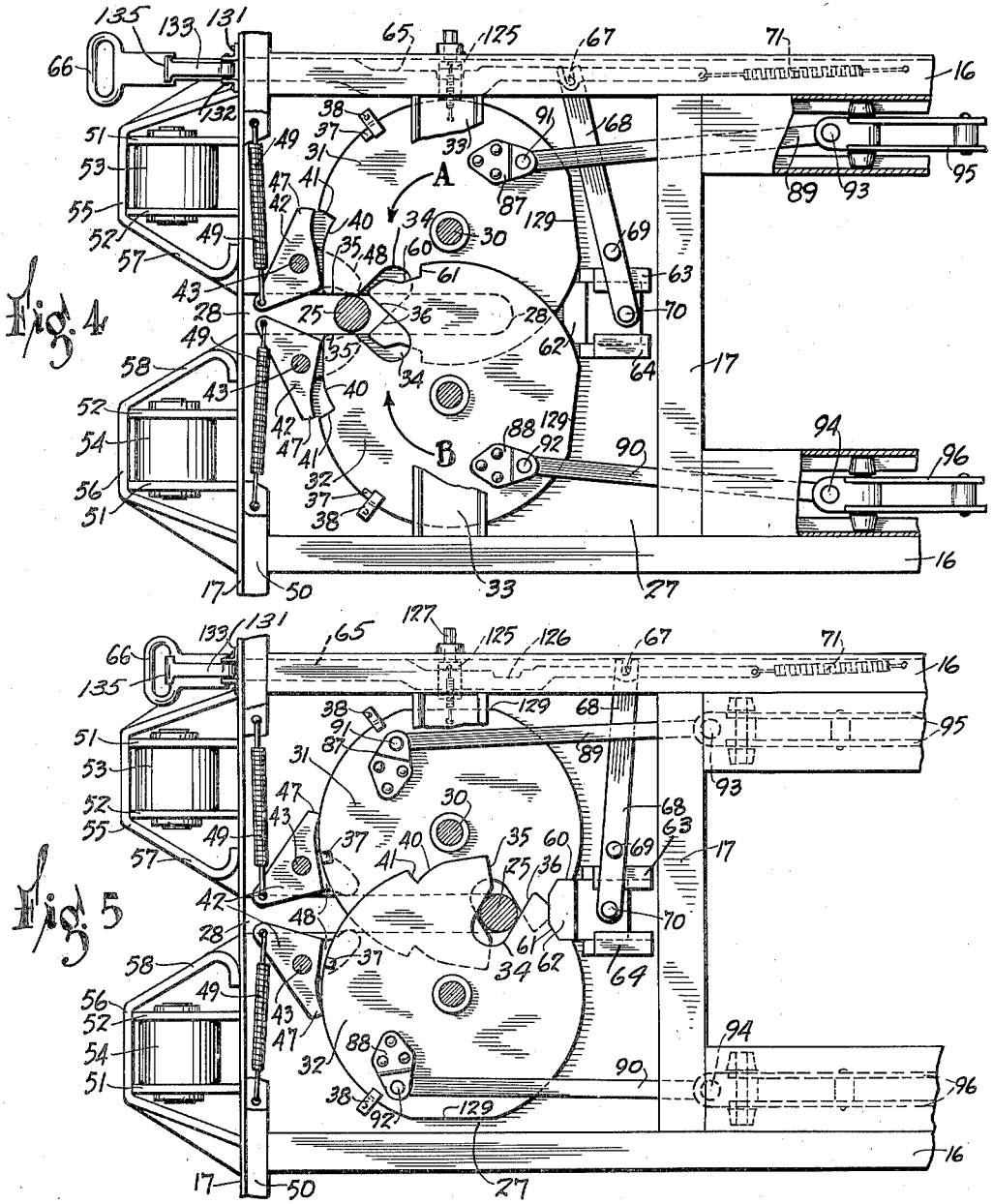

Sept. 24, 1940.    W. H. EDWARDS    2,215,903
TRACTOR-TRAILER COMBINATION
Filed Oct. 10, 1936    3 Sheets-Sheet 3
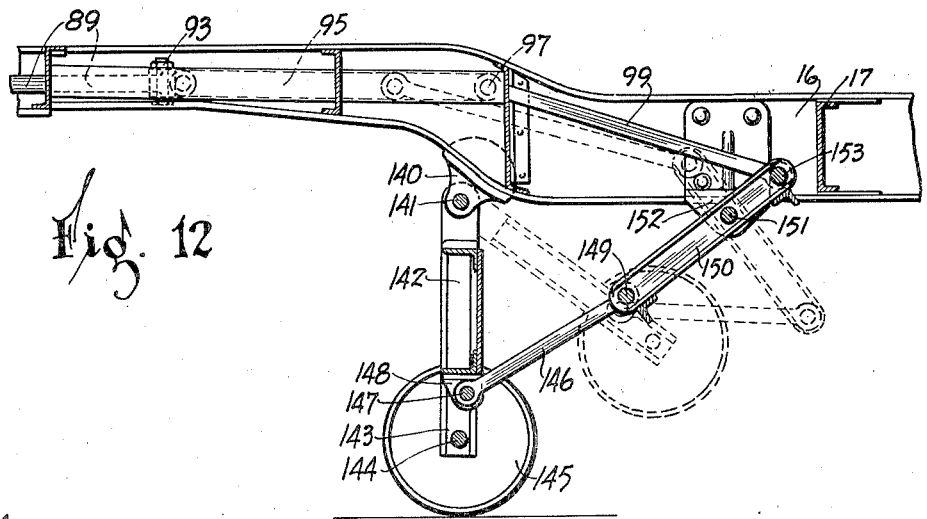
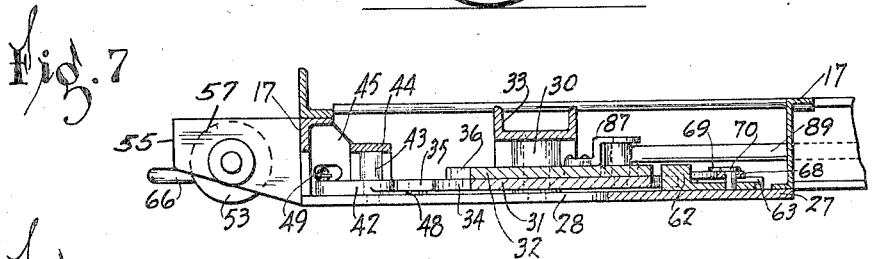
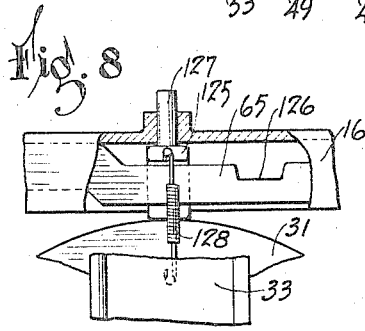
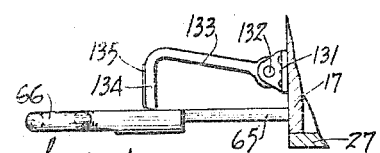
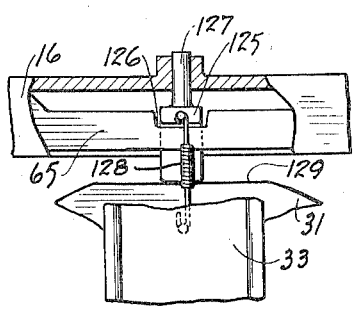
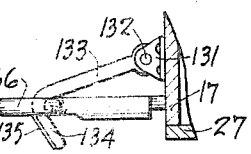
*INVENTOR.*
WILLIAM HOWARD EDWARDS
BY
*ATTORNEY.*

Patented Sept. 24, 1940

2,215,903

UNITED STATES PATENT OFFICE 2,215,903

TRACTOR-TRAILER COMBINATION

William Howard Edwards, South Bend, Ind.

Application October 10, 1936, Serial No. 104,991

26 Claims. (Cl. 280—33.1)

This application is a continuation in part of my copending application Serial No. 87,507, filed June 26, 1936. So far as possible, the drawings are the same as in said application Serial No. 87,507, the specification is the same, and like reference numerals will refer to like parts throughout the several views.

This invention relates to a tractor and trailer combination and particularly to a coupling means therefor which may be used to operate the landing gear or drop wheels attached to the front of the trailer.

One of the primary objects of my invention is to provide a tractor-trailer coupling which includes a pair of rotatable members which are rotatable to a position to receive the king-pin and are rotatable to a coupling position by a force exerted thereon by the king-pin.

Another object is to provide a tractor-trailer coupling which includes a pair of rotatable members having slots therein positioned to receive the king-pin and rotatable to a coupling position, with means to lock the members against accidental rotation to prevent release of the king-pin.

Another object is to provide a tractor-trailer coupling which includes a pair of rotatable members having slots therein rotatable to receive the king-pin and rotatable to a coupling position, with a locking member to lock the members against accidental rotation to prevent release of the king-pin but movable to and held in unlatched position to permit release of the king-pin when so desired.

Another object is to provide a tractor-trailer coupling which includes a pair of rotatable members rotatable to lock the king-pin therein with a locking member movable into engagement with the rotatable members to prevent accidental release of the king-pin, and movable to released position to permit release of the king-pin, together with signaling means to indicate whether the locking member is in locking or released position.

Another object is to provide a tractor-trailer coupling which includes a pair of rotatable members rotatable to lock the king-pin therein, the rotation of the members operating to raise and lower the drop wheels supported at the front end of the trailer.

A further object is to provide a fifth wheel construction in which the king-pin carried by the tractor is received and locked in a pair of rotatable members carried by the trailer to hitch the trailer to the tractor, with locking means to prevent the accidental release of the tractor from the trailer, and means to indicate whether the locking means is in locking or released position.

Another object is to provide a tractor-trailer coupling which comprises a pair of members rotatably supported by the trailer, a king-pin supported by the tractor engageable with the rotatable members whereby longitudinal movement of the tractor relative to the trailer will cause the king-pin to rotate the members to coupling position, the rotation of the members to coupling position causing the drop wheels supporting the front end of the trailer to be raised out of ground-engaging position and rotation of the members in the opposite direction to lower the wheels into ground-engaging position.

Other objects, and objects relating to details of construction and methods of manufacture and operation will be apparent from the drawings and the detailed description to follow.

In the accompanying drawings which show one suitable embodiment of my fifth wheel construction and two forms of drop wheels and in which like numerals refer to like parts throughout the several views:

Fig. 1 is a side elevation of a tractor and trailer showing my invention incorporated therewith;

Fig. 2 is a top plan view of the forward part of the trailer with the body removed showing the rotatable members in king-pin receiving position and the drop wheels connected therewith;

Fig. 3 is a detailed sectional view taken on the line 3—3 of Fig. 2;

Fig. 4 is an enlarged fragmentary plane view similar to Fig. 2 showing the king-pin about to enter the slots in the rotatable members;

Fig. 5 is a view similar to Fig. 4 showing the king-pin and rotatable members in coupling position;

Fig. 6 is an enlarged view of a portion of the tractor with the lower fifth wheel member mounted thereon.

Fig. 7 is a sectional view similar to Fig. 3 but on an enlarged scale showing the rotatable members and parts associated therewith;

Fig. 8 is a fragmentary detailed view of one of the rotatable members and the sliding arm for operating the locking member therefor together with the latch for the arm in released position;

Fig. 9 is a view similar to Fig. 8 with the latch in latching position;

Fig. 10 is a detailed view of the sliding arm shown in Fig. 8 with the operating handle therefor and a latch for the handle which also forms a signal in disengaged position;

Fig. 11 is a view similar to Fig. 10 with the latch engaging the handle;

Fig. 12 is a view similar to Fig. 3 showing a modified form of drop wheels.

It has been common practice to mount the forward end of trailers, sometimes referred to as semi-trailers, on the rear of a tractor by means of a fifth wheel compising a lower member supported on the tractor and an upper member carried by the trailer in a manner so that the tractor can be turned from a straight course relative to the trailer. Several different designs of fifth wheels have been employed for coupling tractors and trailers but so far as I am aware no one has heretofore employed an upper fifth wheel member which comprises a pair of rotatable members which are rotatable to a position to receive the king-pin and then are rotated to a coupling position by the force of the king-pin acting thereon when the tractor is backed under the trailer or if perchance the trailer is moved forwardly over the rear end of the tractor. Furthermore, I am not aware that others have heretofore used the upper fifth wheel member to raise and lower the landing gear or drop wheels attached to the front end of the trailer which are adapted to support the trailer when the same is detached from the tractor.

By my invention I have provided an upper fifth wheel which comprises a pair of rotatable members which are rotatable to the coupling position and locked in that position and, if desired, the drop wheels are simultaneously raised from ground engaging position by that rotation and are lowered into ground engaging position by the forward movement of the tractor relative to the trailer during the uncoupling operation.

In order that others skilled in the art may better understand my invention reference will be had to the accompanying drawings which in Fig. 1 I have shown a tractor indicated generally by the numeral 10 having driving wheels 11 and front or steering wheels 12 on which is carried a frame 13 having a cab 14 mounted thereon immediately at the rear of the hood 15 covering an engine, not shown. The trailer comprises frame side member 16 connected by suitable cross members 17 on which may be mounted a body 18 supported on rear road wheels 19. As illustrated, the trailer side frame members 16 have offset portions 20 therein forwardly of which is positioned the upper fifth wheel presently to be described.

Adjacent to the rear end of the tractor frame 13 is mounted a cross member 21 on which a lower fifth wheel member 22 which, as illustrated, comprises a flat plate having depending lugs 23 thereon pivoted at 24 to the cross member 21. Substantially in the center of the lower fifth wheel member 22 is secured a king-pin 25 which extends upwardly therefrom. As is best illustrated in Fig. 6, immediately at the rear of the lower fifth wheel member 22 I preferably provide an inclined track or platform 26 which permits the forward end of the trailer to slide onto the tractor so that the king-pin 25 can enter the slots in the upper fifth wheel members to permit the coupling of the tractor and trailer when the tractor is moved rearwardly under the trailer.

Referring particularly to Figs. 2, 3 and 7, a bottom plate 27 having a forwardly extending king-pin receiving slot 28 therein is secured to the bottom faces of the trailer frame side member 16 and also preferably is secured to the two front frame cross members 17. The plate 27 is provided with suitably spaced apertures to receive the journals 30 on which, or with which, the members 31 and 32 comprising the upper fifth wheel are adapted to rotate. I also preferably provide a frame cross member 33 which, as illustrated, may be a channel iron which extends across the rotatable members 31 and 32 to provide suitable upper bearings for the journals 30.

As is best illustrated in Figs. 2, 4 and 5, the members 31 and 32 are positioned in overlapping relationship in a manner so that each of the members clears the journal 30 for the other member when the same are rotated into king-pin receiving position or coupling position. Each of the members 31 and 32 may be similar in form except that they are positioned in reverse relationship so that the detailed description will apply to both members and corresponding parts will be referred to with similar reference numerals. The disks 31 and 32 are provided with radially extending slots 34 therein which terminate at one side in faces 35 which in the positions shown in Fig. 4 are substantially parallel with the slot 28 in the bottom plate 27. The opposite sides of the slots terminate in projections 36 which form receiving edges or abutments against which the king-pin 25 will strike to rotate the members 31 and 32 as will be more fully described hereinafter. Each of the disks 31 and 32 have an abutment 37 thereon adapted to engage against stops 38 secured on the bottom plate 27 and which overlie the respective members 31 and 32 so that the members 31 and 32 are prevented from rotation in a direction opposite to the arrows A and B from the position shown in Fig. 4 but permitting free rotation of the members in the direction of the arrows A and B.

The members 31 and 32 are each provided with a recess 40 formed with a shoulder 41 adapted to receive the latching members 42 pivotally supported at 43 on the bottom plate 27 and a cross plate 44 secured to brackets 45 extending rearwardly from the front cross frame member 17. Each of the latches 42 which may be identical in form but positioned in reverse relationship have a pawl 47 adapted to seat in the recesses 40 in the disks 31 and 32 and abut against the stops 41 as shown in Fig. 2 to prevent rotation of the members 31 and 32 in the direction of the arrows A and B when the king-pin 25 has moved forwardly beyond the edges 35 of the slots in the respective members. Each of the latch members 42 is provided with a tongue or trip member 48 which, when the pawls 47 are in position to seat in the recesses 40 against the stops 41, extend across the face of the slot 28 in the bottom plate 27 in the path of the king-pin 25 so that as the tractor is moved under the trailer the king-pin will strike against the trip members 48 to move the pawls 47 out of engagement with the stops 41 to permit rotation of the members 31 and 32 in the direction of the arrows A and B. The latch members 42 are each urged toward the position wherein the trip members 48 will lie in the path of the king-pin 25 by the springs 49, each having one end thereof attached to the respective latch 42 and the other end attached to an upper cross frame member 50 on the trailer. It will therefore be apparent that as the king-pin 25 moves rearwardly in the slot 28 to move the pawls 47 outwardly as shown in Fig. 4 that the pivotal movement of the latches 42 is against the tension of the springs 49 and that after the king-pin 25 has passed beyond the trip members 48 that the springs 49 will tend to move the latch members 42 to a position where the pawls 47 will tend to seat in the recesses 40 against the stops 41 on the members 31 and 32.

Secured to the front of the trailer are suitable brackets 51 and 52 which rotatably support the rollers 53 and 54 which may roll on the platform 26 at the rear of the fifth wheel 22 on the tractor to permit the tractor to be easily pushed under the trailer. I also provide guide members 55 and 56 having inclined faces 57 and 58 leading toward the slot 28 in the bottom plate 27 so that as the tractor is moved rearwardly relatively to the trailer the king-pin 25 will be guided into the slot 28 and that further rearward movement of the tractor will cause the king-pin to first engage with the trip members 48 formed on the latches 42 to move the pawls 47 out of engagement with the rotatable members 31 and 32. Further rearward movement of the tractor will cause the king-pin 25 to engage against the faces 36 of the slots 34 in the members 31 and 32 so that continued rearward movement of the tractor will cause the king-pin 25 to rotate the members 31 and 32 in the direction of the arrows A and B to the coupling position as best illustrated in Fig. 5. The rotation of the members 31 and 32 from king-pin receiving position as shown in Fig. 4 to coupling position as shown in Fig. 5 is illustrated as being approximately 80 degrees. However, I have found that in some arrangements it is desirable to cause the members 31 and 32 to rotate greater or lesser amounts, the above example being given as one satisfactory commercial arrangement.

Each of the members 31 and 32 adjacent to the radially extending slots 34 therein is recessed at 60 to provide shoulders 61 into which the locking member 62 extends when the members are rotated to coupling position as is best shown in Fig. 5. The locking member 62 is supported on the bottom plate 27 between guideways 63 and 64. To move the locking member 62 out of engagement with the rotatable members 31 and 32 I provide a sliding arm 65 suitably supported in one of the frame side members 16 to which is attached a handle 66 for manual operation. The sliding arm 65 has a pivot pin 67 thereon extending into a slot in the end of an arm 68 which is pivotally supported intermediate its ends at 69 on the bottom plate 27 and at its opposite end at 70 to the locking member 62.

It will be apparent from an inspection of Fig. 5 that by pulling the handle 66 to the left from the position shown that the swinging arm 68 will cause the locking member 62 to move to the right or out of engagement with the members 31 and 32.

Referring now to additions to my copending application, a latch 125 as is best illustrated in Figs. 8 to 11, inclusive, is interposed between the sliding arm 65 and frame member 16 and has a shank or tail piece 127 slidably received in the vertical flange of the side frame member 16. The latch 125 is urged toward the rotatable member 31 by a spring 128 attached at one end to the latch 125 and at its other end to the cross member 33. The rotatable members 31 and 32 are provided with flat portions 129 on the peripheral faces thereof which are rotated to a position substantially parallel with the side frame members 16 when the locking member 62 is in engaged position with the rotatable members 31 and 32 as shown in Fig. 5. When the handle 66 is pulled to the left from the position shown in Fig. 5 to disengage the locking member 62 from the rotatable members 31 and 32, the latch 125 will drop into a recess 126 in the sliding arm 65 as is best shown in Fig. 9, permitting the inner face thereof to seat against the flat face 129 on the rotatable member 31.

When the sliding arm 65 is moved to the position so that the latch 125 seats in the recess 126, the locking member 62 will be maintained out of engagement with the rotatable members 31 and 32 and the latter will be permitted to rotate in the direction opposite to the arrows A and B on Fig. 4 so that the king-pin 25 can be disengaged therefrom. When the locking member 62 is latched in released position and the member 31 is rotated, the latch 125 will be raised out of the slot 126 in the slidable arm 65 at the time the flat face 129 on the member 31 moves past the position shown in Fig. 9. The locking member 62 will then be urged toward the rotatable members 31 and 32 by the tension of the spring 71 which is secured at one end to the arm 65 and at its opposite end to the frame side member 16 to automatically again engage the members 31 and 32 when the tractor is moved rearwardly relative to the trailer and the king-pin 25 is moved to coupling position.

From the above description it will be seen that the operator of the tractor can pull the handle 66 to the left from the position shown in Fig. 5 to disengage the locking member 62 from the rotatable members 31 and 32 whereby the same will be held in disengaged position by the latch 125 seating in the slot 126 in the sliding arm 65 and held in that position so that he can maneuver the tractor relative to the trailer to uncouple the same. It is not necessary, however, for the operator to give any attention to the locking of the rotatable members because when the king-pin 25 is moved to coupling position the locking member 62 will automatically seat in the slots 60 in the rotatable members 31 and 32 to prevent rotation thereof.

Referring particularly to Figs. 10 and 11, a bracket 131 is secured to the front face of the front cross frame member 17 in which is pivoted at 132 a latch 133 and a downwardly extending hook 134. When the locking member 62 is in engaged position as shown in Fig. 5, the hook 134 of the latch 133 will drop into the handle 66 to prevent accidental movement of the sliding arm 65. When the operator desires to unlatch the locking member 62, as previously described, he will move the hook 134 of the latch member 133 out of engagement with the handle 66 whereupon the latter together with the sliding arm 65 may be pulled to the left from the position shown in Fig. 5 to release the locking member 62 from engagement with the rotatable members 31 and 32.

I preferably provide a signal or indicating means 135 on the front or forward face of the hook portion 134 of the latch 133 so that the operator can observe from the tractor cab whether the locking member 62 is in engaged or disengaged position. One suitable indicating means is to provide a finish 135 on the latch 133 which is in contrast with the paint or finish of the trailer chassis which may be easily seen when the latch 133 is raised to the position shown in Fig. 10 and which will be obscured when it is dropped to the position shown in Fig. 11. From the foregoing it will be seen that the operator can determine at a glance whether the king-pin 25 is locked in the rotatable members 31 and 32, it not being necessary for him to get out of the tractor cab to make that observation.

While I have shown the operating means for the locking member 62 as mounted in the right side frame member 16 it will be evident that it can be mounted in the left side frame member merely by a reversal of the parts, as the rotatable members 31 and 32 may be identical except that they are in reverse position and the position of the link 63 and the swinging arm 65 operatively connected therewith having the handle 66 thereof may be mounted on the other side of the vehicle without making any structural changes.

Referring again to the structure shown and described in my copending application, I have described in detail the upper fifth wheel or the part which is preferably attached to the trailer which includes the two rotatable members 31 and 32 that are rotatable in opposite directions upon pressure being exerted thereagainst by the king-pin 25 to move the same to coupling position together with the means for locking the rotatable members against accidental rotation and also the latching means for holding the members 31 and 32 in the king-pin receiving position. When it is desired to uncouple the tractor from the trailer the operator will pull the handle 66 on the sliding arm 65 to thus release the locking member 62 from engagement with the members 31 and 32 whereupon the king-pin 25 is permitted to move forwardly in the slot 28 in the bottom plate 27 and cause the members 31 and 32 to rotate in the direction opposite to the arrows A and B as shown on Fig. 4 which will rotate the members to the position shown therein. As the trip members 48 on the latches 42 are held out of the path of the king-pin during that movement, the king-pin 25 is free to move forwardly and along the faces 35 on the respective members 31 and 32 spreading the same apart which will cause the members 31 and 32 to rotate to a position whereby the pawls 47 will be permitted to seat in the depressions 40 and latch therein to thereby hold the members 31 and 32 against rotation in either direction because of the pawls 47 engaging in the recesses 40 in the members 31 and 32 and the stops 37 on each of the members engaging against the stops 38 supported by the lower plate 27.

The above construction may be used independently or in conjunction with a landing gear or drop wheels carried at the front end of the trailer and connections therefrom to the rotatable members 31 and 32 will now be described. The drop wheels chosen for illustration may be substantially like those shown in John S. Edwards Patent No. 2,008,948 issued July 23, 1935, and the construction thereof comprises brackets 75 secured to each of the frame side members 16 which are pivotally connected at 76 to the depending legs 77 having suitable bearings 78 at the lower ends thereof for receiving an axle or shaft 79 for a pair of road or drop wheels 80 suitably mounted thereon, and a pair of links 81 extending upwardly and rearwardly from the drop legs 77 pivotally connected thereto at 82. The rearward ends of the links 81 are pivoted at 83 to a swinging bracket 84 which is pivotally supported at its opposite sides at 85 on blocks 86 rigidly secured to one of the cross frame members 17 which is attached at its opposite ends to the side frame member 16. The links 81 and the swinging bracket 84 comprise a toggle mechanism which with the depending legs 77 and the connections thereon form a brace for the drop wheels 80 when lowered to operative or ground engaging position.

The rotatable members 31 and 32 have brackets 87 and 88 secured thereon to which links 89 and 90 are pivotally connected at their forward ends at 91 and 92. The rear ends of the links 89 and 90 are pivoted at 93 and 94 to slide rods 95 and 96 which are suitably guided in the frame side members 16. To the rear ends of the slide rods 95 and 96 are pivoted at 97 and 98 a pair of links 99 and 100 which are pivotally connected at 101 and 102 to the swinging bracket 84 forming part of the toggle mechanism for supporting the drop wheels 80.

When the upper fifth wheel comprising the rotatable members 31 and 32 are in king-pin receiving position as illustrated in Figs. 2 and 4, the drop wheels 80 will be moved to ground engaging position. As the rearward travel of the king-pin 25 rotates the members 31 and 32 in the direction of the arrows A and B to coupling position the links 89 and 90 will be pulled to the left from the position shown in Figs. 2 and 4 which will operate through the slide rods 95 and 96 and the links 99 and 100 to swing the bracket 84 to the dotted line position shown in Fig. 3 and consequently raise the drop wheels 80 to elevated position.

When the king-pin 25 is in coupling position as shown in Fig. 5 and it is decided to uncouple the tractor from the trailer, the operator will first disengage the lock 62 from the members 31 and 32 whereupon the members 31 and 32 will be permitted to rotate in directions opposite to the arrows A and B in Fig. 4 which will cause the links 89 and 90 to move toward the right from the position shown in Fig. 5 which will operate through the slide rods 95 and 96 to push the swinging bracket 84 downwardly from the dotted line position shown in Fig. 3 to the full line position illustrated, thus swinging the drop wheels 80 to ground engaging position. I prefer to so proportion the links 99 and 100 and the pivoted connection thereof on the swinging bracket 84 and the links 81 so that when the drop wheels are moved to ground engaging position that the pivot 83 is beyond a straight line drawn between the pivots 82 and 85 to thus provide a more effective toggle construction so that the drop wheels will not be accidentally moved out of ground engaging position.

When the king-pin 25 is moved forwardly from the position shown in Fig. 5 to rotate the members 31 and 32 the latter will cause the drop wheels 80 to be moved to full ground engaging position as illustrated in Fig. 3. The king-pin passes between the faces 35 of the slots 34 so that uncoupling of the tractor from the trailer is prevented until the drop wheels have been moved to full ground engaging position. Also the latch members 42 do not operate, or are not effective in the operation of, the drop wheels to ground engaging position as the same can enter the depressions 40 in the rotatable members 31 and 32 only after the king-pin 25 has rotated the members to full disengaging position during which rotation the drop wheels will have been moved to ground engaging position.

After the king-pin 25 moves forwardly beyond the faces 35 of the slots 34 in the members 31 and 32, it will normally pass between the latch members 42 so that the tractor can be disconnected from the trailer. If the springs 49 fail to move the latch members 42 into the recesses 40 in the members 31 and 32, or if for any other reason the latch members 42 fail to seat in the recesses 40, the latch members 42 will remain in substantially the position shown in Fig. 4 so that the king-pin 25 will not pass between the adjacent edges thereof. Thus, in the event the latch members 42 should fail to seat in the recesses 40 the king-pin 25 will not be free to move forwardly so that the tractor can be completely disengaged from the trailer. It will thus be seen that the latch members 42 are adaptable to prevent rotation of the members 31 and 32 in the direction of the arrows A and B shown on Fig. 4, when the same seat in the recesses 40 and that they have the further advantage of preventing the king-pin 25 from moving forwardly out of contact with the trailer in the event the members 31 and 32 are not rotated in the direction opposite to the arrows A and B of Fig. 4 to the full position shown therein, or if for any reason the latch members 42 fail to enter the recess 40.

In Fig. 12 I have shown a landing gear or drop wheel construction slightly different from that shown in Fig. 3, which comprises brackets 140 secured to each of the frame side members 16 which are pivotally connected at 141 to the depending legs 142 having suitable bearings 143 at the lower ends thereof for receiving an axle or shaft 144 having a pair of road or drop wheels 145 mounted thereon, and a pair of links 146 extending upwardly and rearwardly from the drop legs 142 pivotally connected at their forward ends at 147 to brackets 148 suitably secured to the drop legs 142. The ends of the links 146 opposite to the pivots 147 are pivoted at 149 to the forward ends of a pair of arms 150 pivoted intermediate their ends at 151 in brackets 152 secured to the frame side member 16.

The connection between the rotatable members 31 and 32 to the drop wheels 145 may be substantially like that shown in Figs. 2 and 3 and comprises a pair of links therebetween, the link 89 being shown as pivotally connected at its rearward end at 93 to the slide rod 95 which is suitably guided in the frame side member 16. The rear end of the slide rod 95 is pivoted at 97 to a link 99, the opposite end of which is pivotally connected at 153 to the arm 150 beyond its pivot 151. While I have described the connection from the rotatable member 31 to the drop wheels 145 it is understood that a similar connection will be provided for the rotatable member 32 in the same manner as is illustrated in Fig. 2. By providing the connection as just described between the drop wheels and the rotatable members, the action or the movement of the drop wheels meets a desirable operating condition as the drop wheels 145, when moved toward ground engaging position, move relatively slow at the end of the travel or as they reach the position shown in full lines in Fig. 12. In other words, as the drop wheels move into engagement with the ground the greatest leverage thereto is applied from the rotatable members through the linkage heretofore described and as they move to inoperative position, they first move slowly from ground engaging position and then move more rapidly to the fully raised position as shown in dotted lines.

It will be apparent from the foregoing description and the drawings that the connection between the rotatable members 31 and 32 and the drop wheels 80 or 145 causes simultaneous movement of the drop wheels during the rotation of the upper fifth wheel member; that is, when the king-pin moves rearwardly along the slot 28 in the bottom plate 27 and the members 31 and 32 are rotated in the direction of the arrows A and B as shown in Fig. 4, that during that movement the drop wheels 80 or 145 will be caused to be moved out of ground engaging position or to the dotted line position as shown in Figs. 3 and 12. Furthermore, as the king-pin 25 is moved forwardly to disengage the tractor from the trailer, that during the rotation of the members 31 and 32 the drop wheels 80 or 145 will be cause to be moved to ground engaging position or the position shown in full lines in Figs. 3 and 12.

While I have shown one suitable embodiment of a coupling means for a tractor and trailer and suitable connections from the upper fifth wheel to two forms of drop wheels for operating the latter, it will be understood that changes in construction, proportion of parts, and methods of manufacture together with other detailed changes would appear to those skilled in the art may be made without departing from the spirit and substance of my invention, the scope of which is to be measured only by the sub-joined claims.

What I claim is:

1. A coupling device adapted to couple a trailer to a tractor comprising, a fifth wheel member, a king-pin projecting therefrom, a pair of rotatable members each having slots therein movable to partially overlapping position to receive said king-pin, said members having recesses therein movable into overlapping position upon movement of said king-pin to coupled position in said slots, and common means conjointly engageable in said recesses to lock said members against said rotation with said king-pin in coupled position.

2. A coupling device adapted to couple a trailer to a tractor comprising, a fifth wheel member, a king-pin projecting therefrom, a pair of laterally spaced pivots, rotatable members mounted thereon and having slots therein rotatable to a partially overlapping position to receive said king-pin, said pivots being so arranged that longitudinal movement of said tractor relative to said trailer produces corresponding movement of said king-pin in said slots between said pivots causing said members to rotate to coupling position, means to lock said members against rotation in coupled position, and manually operable means to release said locking means.

3. A tractor-trailer coupling comprising, a fifth wheel member supported on said tractor, a king-pin projecting therefrom, a plate forming a part of said trailer having a king-pin receiving slot therein, a pair of overlapping members each having king-pin receiving slots therein rotatably supported on said plate, means for guiding said king-pin into said respective slots, rearward movement of said king-pin in the slots in said members causing said members to rotate to coupling position, and means to lock said members in coupling position.

4. A tractor-trailer coupling comprising, a fifth wheel member supported on said tractor, a king-pin projecting therefrom, a trailer plate having a king-pin receiving slot therein adapted to lie on said fifth wheel with said king-pin projecting through said slot, a pair of overlapping members each having radially extending slots therein in partially overlapping position to receive said king-pin, rearward movement of said king-pin relative to said trailer causing said members to rotate to coupling position, and means to lock said members in coupling position.

5. A tractor-trailer coupling comprising, a fifth wheel member supported on said tractor, a king-pin projecting therefrom, a pair of overlapping members each having king-pin receiving slots therein rotatably supported on said trailer, rearward movement of said king-pin relative to said trailer causing said members to rotate in opposite directions substantially 80 degrees to coupling position, and means to lock said members in coupling position.

6. In a tractor-trailer combination, a fifth wheel member supported on said tractor, a king-pin projecting therefrom, a pair of members rotatably supported on said trailer adapted to receive said king-pin and rotate to coupling position, drop wheels pivotally supported on said trailer, and means operatively connecting said rotatable members and wheels so constructed and arranged that rotation of said members to coupling position will raise said wheels from ground engaging position.

7. In a tractor-trailer combination, a coupling therefor comprising, a king-pin and a pair of rotatable members receiving said king-pin, drop wheels supported by said trailer, and means connecting said wheels with said rotatable members so constructed and arranged that rotation of said members in one direction will lower said wheels into ground engaging position and rotation thereof in the opposite direction will raise said wheels from ground engaging position.

8. In a tractor-trailer combination, a coupling therefor comprising, a king-pin and a pair of members receiving said king-pin rotatable in opposite directions, drop wheels supported by said trailer, and a series of links connecting said wheels with said rotatable members so constructed and arranged that rotation of said members to coupling position will raise said wheels from ground engaging position.

9. In a tractor-trailer combination, a coupling therefor comprising, a king-pin and a pair of rotatable members receiving said king-pin, drop wheels supported by said trailer, means connecting said wheels with said rotatable members so constructed and arranged that rotation of said members in one direction will lower said wheels into ground engaging position and rotation thereof in the opposite direction will raise said wheels from ground engaging position, and means engageable with said rotatable members to prevent accidental lowering of said wheels from elevated position to ground engaging position.

10. In a tractor-trailer combination, a coupling therefor comprising, a king-pin and a pair of rotatable members receiving said king-pin, drop wheels supported by said trailer, means connecting said wheels with said rotatable members whereby rotation of said members in one direction will lower said wheels into ground engaging position and rotation thereof in the opposite direction will raise said wheels from ground engaging position, and means engageable with said rotatable members to prevent accidental raising of said wheels from ground engaging position.

11. In a tractor-trailer combination, a coupling therefor comprising, a king-pin and a pair of rotatable members receiving said king-pin, drop wheels supported by said trailer, means connecting said wheels with said rotatable members whereby rotation of said members in one direction will lower said wheels into ground engaging position and rotation thereof in the opposite direction will raise said wheels from ground engaging position, means engageable with said rotatable members to prevent accidental lowering of said wheels from elevated position to ground engaging position, and means engageable with said rotatable members to prevent accidental raising of said wheels from ground engaging position.

12. In a tractor-trailer combination, a fifth wheel member supported on said tractor, a king-pin projecting therefrom, a pair of overlapping members having king-pin receiving slots therein rotatably supported on said trailer, drop wheels pivotally supported on said trailer, and means operatively connecting said rotatable members and wheels so constructed and arranged that longitudinal movement of said king-pin in one direction relative to said trailer will rotate said members to coupling position and simultaneously raise said wheels from ground engaging position and movement of said king-pin in the opposite direction will lower said wheels into ground engaging position.

13. In a tractor-trailer combination, a fifth wheel member supported on said tractor, a king-pin projecting therefrom, a pair of members journaled on said trailer having slots therein adapted to receive said king-pin, drop wheels supported by said trailer, and means connecting said wheels with said members adjacent to the sides thereof opposite to said slots, the respective journals being between said slots and connecting means whereby rotation of said members to coupling position will raise said wheels from ground engaging position.

14. In a tractor-trailer combination, a fifth wheel member supported on said tractor, a king-pin projecting therefrom, a pair of members journaled on said trailer having slots therein adapted to receive said king-pin, links pivotally connected with said members at the sides of the journals opposite to said slots, drop wheels supported by said trailer, and means connecting said drop wheels and links whereby rotation of said members to coupling position will raise said wheels from ground engaging position.

15. In a tractor-trailer combination, a fifth wheel member supported on said tractor, a king-pin projecting therefrom, a pair of members rotatably supported on said trailer adapted to receive said king pin, drop wheels pivotally supported on said trailer, means operatively connecting said rotatable members and drop wheels whereby rearward movement of said king-pin relative to said trailer will rotate said members to coupling position and simultaneously raise said wheels from ground engaging position and reverse rotation of said members will lower said wheels into ground engaging position, and latch members engageable with said rotatable members for holding said rotatable members in king-pin receiving position when said tractor and trailer are disengaged, said latch members also preventing disengagement of said king-pin from said trailer unless said rotatable members are rotated to full king-pin receiving position.

16. A tractor-trailer coupling comprising, a fifth wheel supported on said tractor, a king-pin projecting therefrom, a pair of rotatable members supported by said trailer adapted to receive said king-pin and having complementary recesses therein movable to overlapping position upon movement of said king-pin to coupled position, spring controlled means simultaneously engageable in said recesses when in overlapping position to lock said members in king-pin coupled position, and means to lock said members against rotation in one direction before said tractor is disengaged from said trailer.

17. A tractor-trailer coupling comprising, a fifth wheel supported on said tractor, a king-pin projecting therefrom, a pair of rotatable members supported by said trailer adapted to receive said king-pin and having notches in the periphery thereof, and a pair of pawls engageable in said notches to lock said members in king-pin receiving position, and means for causing said pawls to lock said member against rotation in one direction before said tractor is disengaged from said trailer.

18. A coupling device adapted to couple a trailer to a tractor comprising, a fifth wheel member supported by said tractor, a king-pin projecting therefrom, a pair of rotatable members supported by said trailer each having a radially extending slot therein movable to partially overlapping position to receive said king-pin, longitudinal movement of said king-pin relative to said trailer causing said members to rotate to coupling position, spring controlled means automatically operable upon movement of said members to king-pin coupled position to lock said members against rotation, and manually operable means to move said locking means for said members to released position to permit disengagement of said king-pin from said members.

19. A coupling device adapted to couple a trailer to a tractor comprising, a fifth wheel member, a king-pin projecting therefrom, a pair of rotatable members adapted to receive said king-pin, means to lock said members against rotation with said king-pin received therein, means to hold said locking means for said members in released position to permit disengagement of said king-pin from said members, and rotatable latches to lock said members in king-pin receiving position.

20. A coupling device adapted to couple a trailer to a tractor comprising, a fifth wheel member, a king-pin projecting therefrom, a pair of rotatable members each having slots therein rotatable to a partially overlapping position to receive said king-pin, rearward movement of said king-pin causing said members to rotate to coupled position, means to lock said members against rotation in coupled position, manually operable means to release said locking means, and means to indicate whether said means for locking said rotatable members is in engaged or released position.

21. In a tractor-trailer combination, a coupling therefor comprising, a king-pin and a pair of rotatable members receiving said king-pin, drop wheels supported by said trailer, means connecting said wheels with said rotatable members whereby rotation of said members in one direction will lower said wheels into ground engaging position and rotation thereof in the opposite direction will raise said wheels from ground engaging position, locking means engageable with said rotatable members to prevent accidental lowering of said wheels from elevated position to ground engaging position, and means to hold said locking means in released position to permit lowering of said wheels to ground engaging position.

22. A vehicle having a fifth wheel mechanism including a king-pin, in combination with a second vehicle having a complementary fifth wheel mechanism comprising a pair of keepers arranged bodily one above the other and each having a cam face, and a guide, said guide being arranged to receive said king-pin and direct the same into engagement with each of said cam faces simultaneously whereby said keepers are shifted into interlocking engagement with said king-pin by engagement of said king-pin against the cam faces of said keepers.

23. A vehicle having a fifth wheel mechanism including a king-pin, in combination with a second vehicle having a complementary fifth wheel mechanism comprising a pair of keepers arranged bodily one above the other and each having a cam face, and a guide, said guide being arranged to receive said king-pin and direct the same into engagement with each of said cam faces simultaneously whereby said keepers are shifted into interlocking engagement with said king-pin, by engagement of said king-pin against the cam faces of said keepers, and locking means acting on and preventing shifting of said keepers when they are interlocked with said king-pin.

24. A vehicle having a fifth wheel mechanism including a king-pin, in combination with a second vehicle having a complementary fifth wheel mechanism comprising a pair of keepers arranged bodily one above the other and each having a cam face, and a guide, said guide being arranged to receive said king-pin and direct the same into engagement with each of said cam faces simultaneously whereby said keepers are shifted into interlocking engagement with said king-pin by engagement of said king-pin against the cam faces of said keepers, and automatic locking means acting on and preventing shifting of said keepers when they are interlocked with said king-pin.

25. A vehicle having a fifth wheel mechanism including a king-pin, in combination with a second vehicle having a complementary fifth wheel mechanism comprising a bottom plate provided with a guideway and a pair of overlapping keepers arranged bodily one above the other and each having a cam face, said king-pin being arranged to travel in the guideway and engage the cam faces of said keepers to shift said keepers into interlocking engagement with said king-pin by engagement of said king-pin against the cam faces of said keepers.

26. A vehicle having a fifth wheel mechanism including a king-pin, in combination with a second vehicle having a complementary fifth wheel mechanism comprising a pair of keepers arranged bodily one above the other in overlapping relationship and each having a cam face, a guide, and means for retaining said keepers in symmetrical position relative to said guide, said guide being arranged to receive said king-pin and direct the same into engagement with each of said cam faces simultaneously whereby said keepers are shifted into overlapping interlocking engagement with said king-pin.

WILLIAM HOWARD EDWARDS.